United States Patent [19]
Effland et al.

[11] Patent Number: 5,235,341
[45] Date of Patent: Aug. 10, 1993

[54] METHOD AND SYSTEM FOR MEASURING THE POSITION OF LIGHTNING STROKES

[76] Inventors: John E. Effland, 336 Wye Mill Ct., Gaithersburg, Md. 20879; John M. Gipson, 8209 Grove St., Silver Spring, Md. 20901; David B. Shaffer, 1742 Saddleback Ct., Henderson, Nev. 89014; John C. Webber, 3249 Betsy La., Herndon, Va. 22071

[21] Appl. No.: 868,798

[22] Filed: Apr. 16, 1992

[51] Int. Cl.⁵ .................. G01S 13/00; G01S 3/02
[52] U.S. Cl. ............................ 342/460; 342/26
[58] Field of Search ................. 342/460, 26, 465

[56] References Cited

U.S. PATENT DOCUMENTS

| | | | |
|---|---|---|---|
| 4,792,806 | 12/1988 | Bent et al. | 342/465 |
| 4,914,444 | 4/1990 | Pifer et al. | 342/460 |
| 5,036,334 | 7/1991 | Henderson et al. | 342/460 |

Primary Examiner—Mark Hellner
Attorney, Agent, or Firm—Finnegan, Henderson, Farabow, Garrett and Dunner

[57] ABSTRACT

A method and system for unambiguous pre-detection real time measurement of lightning strokes.

21 Claims, 8 Drawing Sheets

METHOD AND SYSTEM FOR MEASURING THE POSITION OF LIGHTNING STROKES

BACKGROUND OF THE INVENTION

1. Field of the Invention

The present invention relates to interferometric observations; and more particularly, to a method and system for measuring the position of lightning strokes in real time.

2. Discussion of Related Art

In the vicinity of airports where planes are in the process of gaining altitude, circling the terrain awaiting landing and decreasing altitude in preparation for a landing, it is desirable that turbulence can be avoided in order to insure the comfort of the passengers and prevent needless mishaps.

Turbulence lightning strokes are the result of thunderstorms. Thus, if an airport control tower knows the location of lighting strokes, and is able to advise the incoming or outgoing planes of alternate paths, exposure to turbulence in most instances may be minimized or avoided by changing direction or altitude.

At close distances lightning strokes from clouds t ground are visible; and even some cloud to cloud lightning strokes may be observed. However, for the most part lightning strokes, and thus areas of turbulence, which occur within clouds or from cloud to cloud or even cloud to ground are not visible from either the ground, or the air at meaningful locations and distance.

Thus, it is desirable to be able to measure the position of lightning strokes in real time so that the control tower can direct planes to areas of less turbulence, and/or determine the rate and direction of storm movement.

Typically, systems for measuring the location of lightning strokes measure pulse arrival time at two different receivers. Such systems, which must use signals with some form of identifiable time structure work well for single pulses, or for pulses which are widely separated in time. However, if the pulses are closely spaced in time, and originate from different locations, as frequently is the case with lightning, it is possible for the order of the pulses to be confused at the different stations.

Another approach to the ambiguity of resolution of the time delay of arrival (TDOA) measurements is to use secondary characteristics of the pulse, such as shape and duration. This approach also runs into problems if the pulses overlap significantly. It is suitable only for post-real-time analysis because the intervention of a skilled experimenter is required in order to identify patterns in the data.

SUMMARY OF THE INVENTION

One of the objects of the present invention is to provide a system and method for unambiguously measuring the position of lightning strokes in real time.

Another object of the invention is to provide a system and method for measuring the position of lightning strokes in three dimensions.

Still another object of the invention is to provide a system and method that is able to measure the location of more than one lightning stroke occurring simultaneously.

A further object of the present invention is to provide real time location of both cloud to cloud and cloud to ground lightning strokes at a sufficient distance from an airport so that dangerous convective cells can be avoided.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method of measuring the position of a lightning stroke, comprises receiving radiant energy emissions of a lightning stroke independently of one another at least three angularly spaced receivers and at a central receiver spaced from the at least three receivers; sampling a series of radiant energy emission samples from the at least three receivers and the central receiver at a predetermined rate; cross correlating each of the samples for one receiver at with each of the samples of another receiver, taking all the receivers pairwise until all independent cross-correlations are obtained, detecting peak values from the cross-correlated samples; and calculating a location relative to the at least three receivers and the central receiver for determining the position of the lightning stroke.

In another aspect, the invention comprises a method of measuring the location of a lightning stroke in three dimensions, comprising positioning at least three angularly spaced receivers and a fourth central receiver spaced from the three angularly spaced receivers, at least one of the four receivers being in an elevational plane different from the remaining receivers; detecting radiant energy emission of a lightning stroke independently of one another at the at least three angularly spaced receivers and the central receiver; sampling the radiant energy corresponding to the emission from the central location and the at least three angularly spaced receivers at a predetermined rate to generate a series of delayed samples, cross-correlating each of the samples from one receiver with each of the samples from another receiver, taking all the receivers pairwise until all independent cross-correlations are obtained; detecting peak values from the cross-correlated samples; and calculating a location relative to the central receiver corresponding to range, azimuth, and elevation from the receivers.

In still another aspect, the present invention comprises a system for measuring the position of a lightning stroke, comprising; at least three receivers angularly spaced from one another in a coverage area, a central receiver; cable connecting the central receiver to each of the angularly spaced receivers; means for receiving radiant energy corresponding to a lightning stroke at each of the three receivers and the central receiver, means for sampling the received radiant energy from each of the receivers at a predetermined rate; means for cross-correlating the samples, to determine peak values; means for estimating at least the time delay of arrival of the radiation at the at least three angularly spaced receivers relative to the time of arrival of the same radiation at the central receiver; and means for calculating the lightning location in accordance with the estimated time delay of arrival.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings in which like reference characters refer to corresponding elements.

Figure 1:
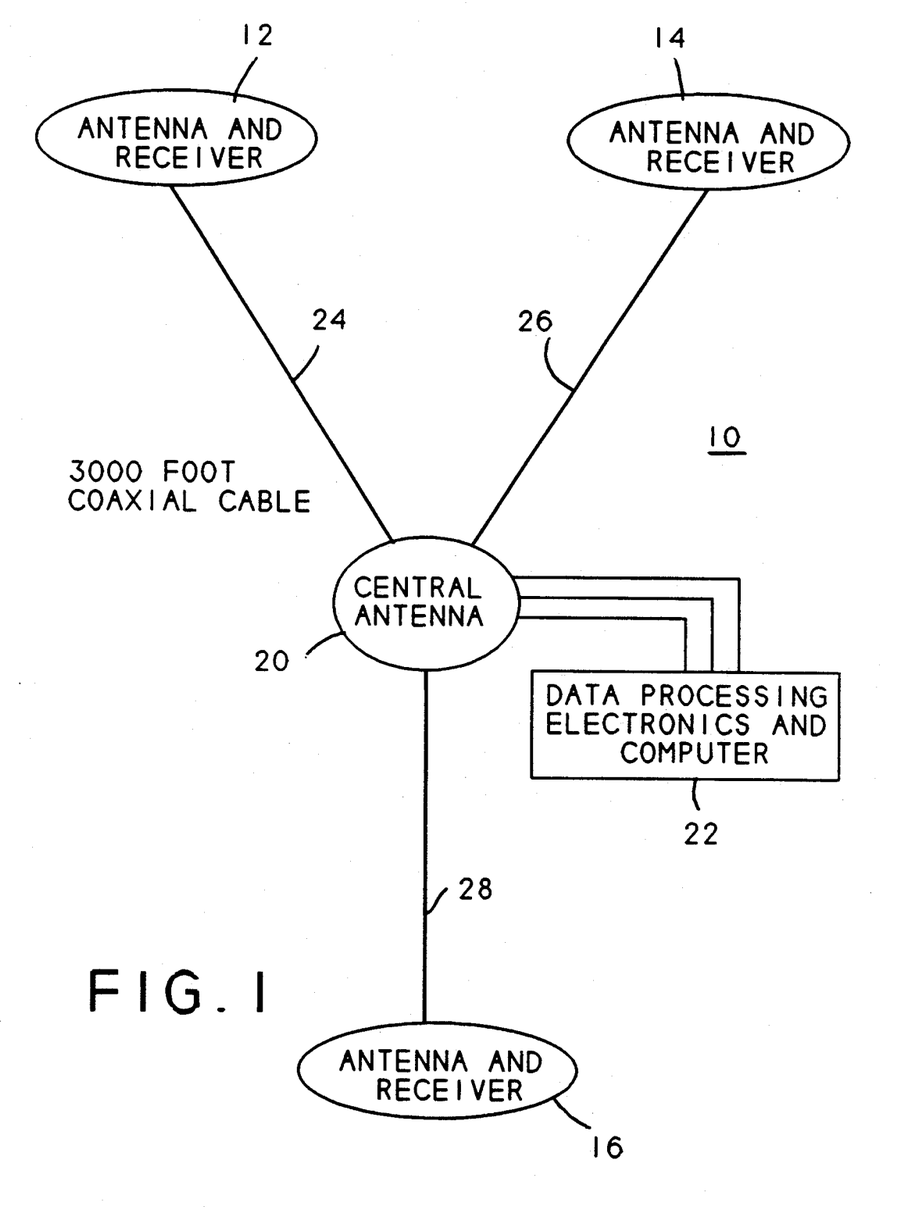
FIG. 1 is a schematic diagram illustrating a preferred position of the receivers in the overall system of the present invention.

In accordance with the present invention, the method of measuring the position of a lightning stroke comprises receiving a radiant energy emission of a lightning stroke independently of one another at least three angularly spaced receivers and at a central receiver connected to and spaced from each one of the spaced receivers. Referring to FIG. 1, a system generally referred to at 10 comprises an antenna and receiver 12, a second antenna and receiver 14, and a third antenna and receiver 16 which are angularly spaced from one another. A central antenna 20 is located separately from each of antennas and receivers 12, 14, and 16, and has connected thereto data processing circuitry and computer apparatus 22. Receivers 12, 14, and 16 are each connected to the data processing equipment by lengths of cable 24, 26, and 28 respectively each of which are of a length, such as 3,000 feet, for example. Cables 24, 26, and 28 may be coaxial cable, or optical fiber.

Figure 2:
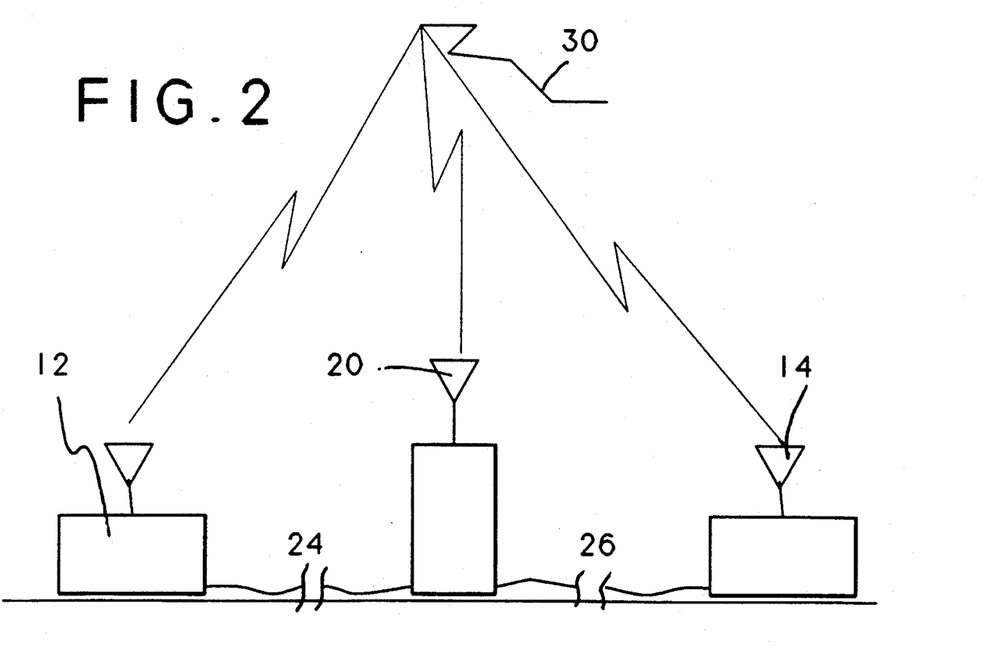
FIG. 2 is a schematic diagram illustrating in elevation the position of the receivers showing the central antenna elevated permitting a lightning stroke to be measured in elevation.

Referring to FIG. 2, the components of the system of FIG. 1 are shown in elevation. It is to be noted that antenna 20 has a higher elevation than receiver 12 and 14, and 16 (not shown). This arrangement permits a different path length in elevation between one of the receivers, such as 20, and each of the outlying receivers 12, 14, and 16 for calculating the position of lightning stroke 30 in elevation. It should be noted that any one of the four receivers 12, 14, 16, and 20 may be on a plane different from the other receivers; or if desired more than one or all of the receivers can be on different planes.

A lightning stroke consists of several events spaced closely in time. Among these is the propagation of a high temperature volume of plasma which is known to radiate radio frequency noise in the VHF band. Emissions are stronger at frequencies lower than VHF, but a 100-200 MHz band is particularly useful because of reduced interference at these frequencies. The present invention use the radio emissions from the hot plasma to detect and locate each lightning stroke. This makes possible the observation of even cloud-to-cloud lightning, which is unobservable with conventional electric field detection methods which measure cloud-to-ground strokes.

At a given instant, the source of electromagnetic radiation from a lightning stroke is a region of hot plasma which is spatially localized, and is at most a few meters in diameter. It is this bright spot of radiation that triggers the present system into operation, which is tracked in three dimensions, namely range, azimuth, and elevation.

The bolt or stroke of lightning is typically a zig zag pattern in which the bright spot of radiation moves rapidly for a certain distance in one direction, then may pause briefly before moving rapidly for another distance in another direction. This bright spot exhibits the radiation received and sampled by the system. The system is fast enough to process the moving bright spot, or leading edge of each segment of the lightning stroke so that the entire lightning path is taken into consideration. A leading edge of a lightning stroke is not stationary, thus, the phase of the emission received at one receiver is changing relative to the phase of the emission received at another receiver during the sampling time.

Proven radio astronomy techniques are used to process a selected region of the spectrum which contains energy from the lightning process. Several full-sky VHF antennas separated by a few kilometers receive the emission. The radio frequency (RF) signals are transmitted over coaxial or fiber optic cables to a central facility where they are downconverted to baseband and digitized. A real-time correlator whose operation is gated by the radio noise from each stroke performs immediate analysis. The data is processed using pre-detection correlation to determine the relative delay and Doppler shift of the signal between pairs of receivers. The spatial and temporal resolution of the system is an order of magnitude greater than previous post-detection systems which tested the concepts of lightning location by means of post-detected VHF radio emission.

In accordance with the method of the present invention there is involved sampling a series of radiant energy emission samples from at least three receivers and the central receiver at a predetermined rate. As herein embodied, the (TDOA) is determined by taking a time series of samples of a downconverted signal received at one receiver, and cross-correlating it at multiple delays with the signals received at other receivers. Since the radio noise emitted by the same lightning stroke at different times is uncorrelated, the pre-detection cross-correlation will vanish for most values of the delay. The cross-correlation function will have a peak at that value of the delay which compensates for the geometric difference in path lengths. This processing does not rely on any time structure of the signal, and thus, we can unambiguously determine the TDOA. With multiple cross-correlations using different antennas, we can find multiple crossing TDOA lines which yield a position.

Group delay is determined by locating the lag or time offset in the cross-correlation function computed from the data samples received at two stations for which the cross-correlation magnitude is greatest.

Figure 3:
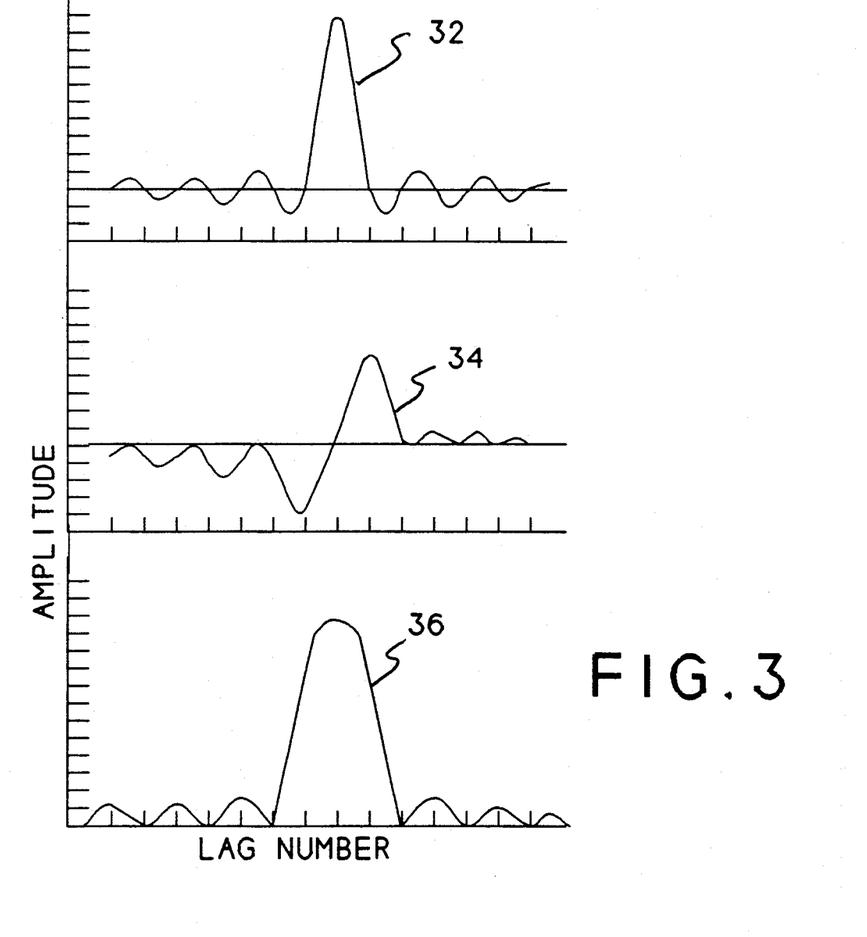
FIG. 3 is a diagram illustrating waveforms corresponding to the quadrature output of I and Q channels of a central receiver and a correlated waveform in accordance with the principles of the present invention.

Referring to FIG. 3, curve 32 represents the output of an in-phase or I channel of the correlation, curve 34 represents the output of a quadrature or Q channel and curve 36 represents the magnitude of the correlation, all as a function of the lag number of for the situation where the source of emission is equidistant from the two receivers whose samples are being correlated. The term LAG as used herein is the amount of time by which each sample from one receiver is delayed before being multiplied by a sample from another receiver. The sampling is preferably at least twice the bandwidth. The correlation produces a group delay, which is a pre-detection measurement in that the voltages induced in the receivers 12, 14, 16, and 20 are sampled, and not power incident upon the receivers averaged over some time interval. For example, for a bandwidth of 5 MHz with receivers that are ten kilometers apart, a delay of plus or minus 30 microseconds could occur which requires a six hundred lags to measure for worst case locations, such as when the source of radiation lies in a direction aligned with the line connecting the two receivers.

Figure 4:
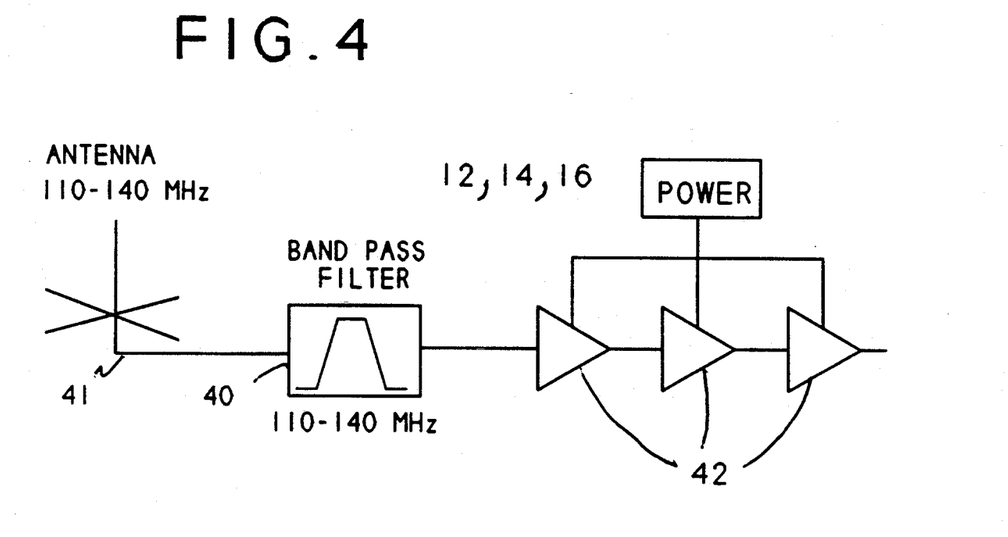
FIG. 4 is a schematic diagram of receivers located spaced from the central antenna.

Referring to FIG. 4, receiver 12, 14, 16 each have an antenna capable of collecting radiant energy in the neighborhood of 110 to 140 MHz with a band pass filter 40 and power amplifiers 42 connected to output the received energy over respective cables 24, 26, and 28.

Figure 5A:
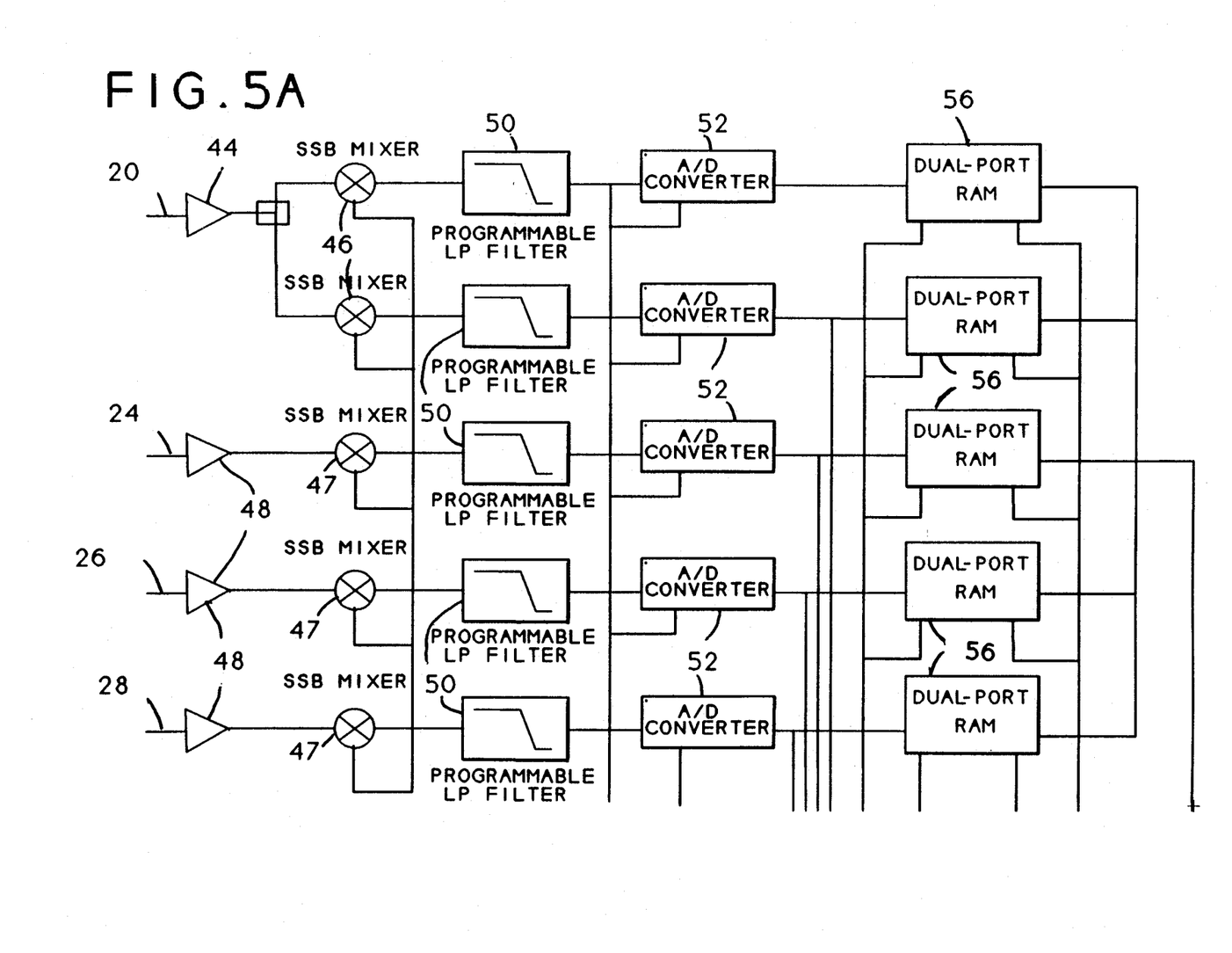
FIGS. 5a and 5b are a schematic diagram of the central receiver processing apparatus for interfacing with a computer.
Figure 5B:
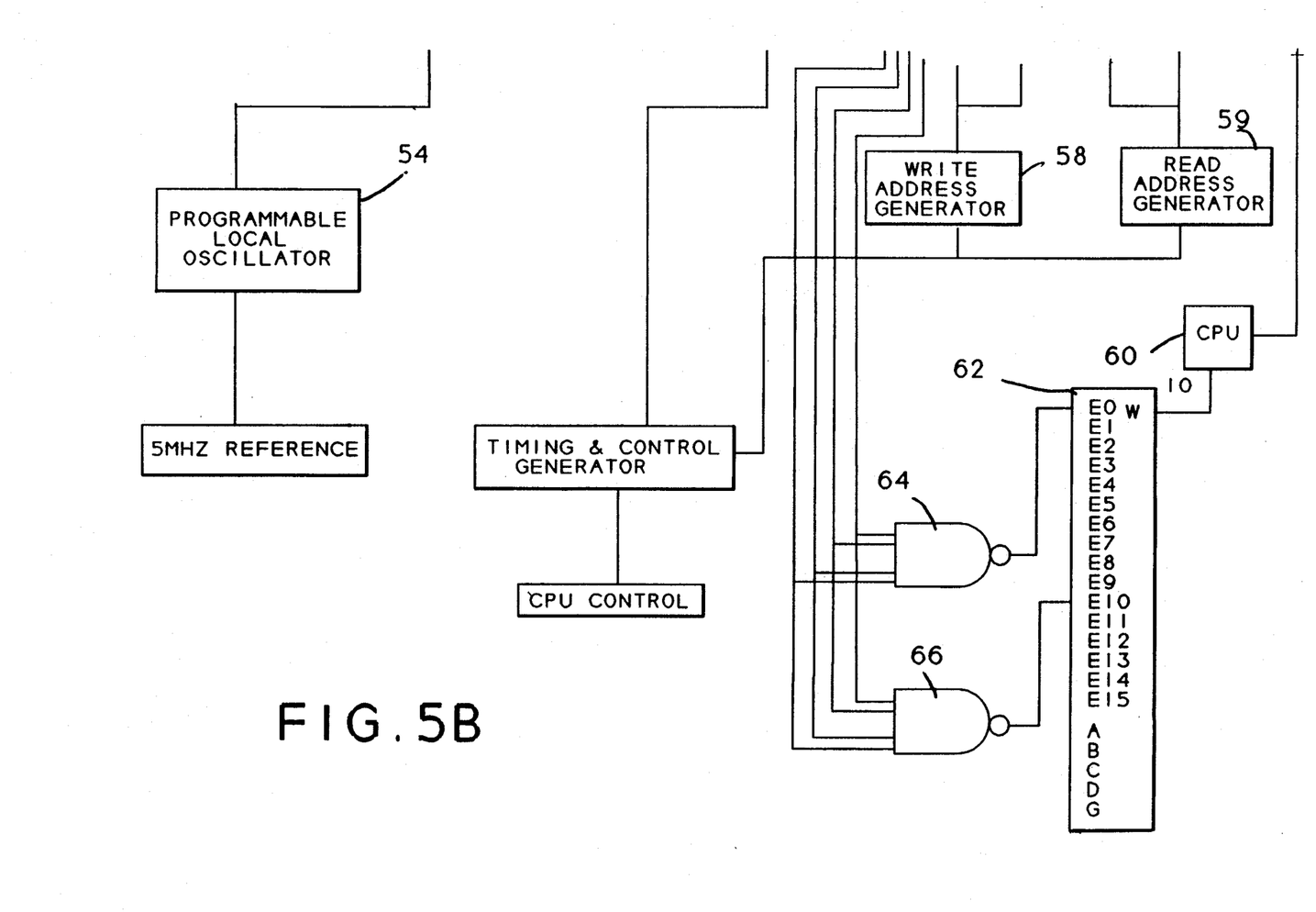

Referring to FIG. 5, a signal from central station antenna 20 is input to an amplifier and filter 44 for outputting in-phase and quadrature phase signals to single sideband mixers 46. Receivers 12, 14, and 16 are connected by lines 24, 26, and 28 through amplifiers to single sideband mixers 48. Each of the mixers are connected to inputs of one of a plurality of programmable filters 50, which in turn are connected to respective analog to digital converters 52. Mixers 46 and 48 operate to extract a 5 MHz or another bandwidth from the high frequency received, which may be in the order of 100 MHz. A programmable local oscillator 54 is provided to change the frequency for calibration purposes, for example. Programmable low pass filters 50 are provided for permitting the changing of the 5 MHz bandwidth because of operational or ambient problems, for example. Analog to digital converters 52 convert the analog samples to digital samples. A dual port RAM 56 is connected to the output of each analog to digital converter 52. The dual port RAMS write data into memory by means of write address generator 58 while it is reading data out of memory by a read address generator 59. The dual port RAMS 56 serve as real time buffers between converters 52 and a computer 60. An event trigger device has inputs of two NAND gates 64 and 66, which output a signal in the event any one of the antennas 12, 14, 16, or 20 generate a signal which releases or causes the interrupt to computer 60 over line 62 to start the computer. This permits the system to be ready with the receivers collecting the samples and the buffers 56 constantly filling up with new digital samples, but in a pause mode when no lightning is happening, and upon the commencement of a lightning stroke, the cross-correlation routine commences.

In accordance with the invention, the method of the present invention includes the step of cross-correlating each of the samples for one receiver with the samples from another receiver, taking all of the receivers pairwise until all the independent correlations are obtained, and detecting peak values from the cross-correlated samples.

As embodied herein, the correlator is preferably implemented in software by a computer having the capabilities of a conventional 386 machine or better. However, if desired, the correlator may be implemented in hardware as described in our U.S. Pat. No. 5,008,679 issued on Apr. 16, 1991 to which reference is made for a discussion of certain details therein common to the present application and which is incorporated herein by reference.

Independent cross-correlations are three cross-correlations of pairs out of a possible six correlations. For example, the pairwise correlation of samples of receivers 12 and 20, 14 and 20, and 16 and 20 as shown in FIG. 1 are independent. Also, pairs 14 and 16, 16 and 20, and 12 and 16 are independent; as well as pairs 12 and 20, 12 and 14, and 12 and 16. However, the correlation of 12 and 16, 14 and 16, and 12 and 14 are not independent, for example.

Figure 6:
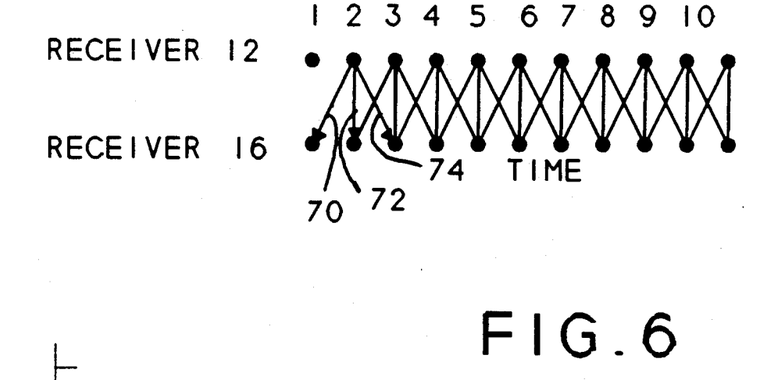
FIG. 6 is a graphical representation illustrating principles of cross-correlation in accordance with the present invention.

Referring to the diagram of FIG. 6, the samples from receivers 12 and 16 are set out in rows and columns to represent a series of time $\Delta + T$ samples to illustrate lags as previously defined. Arrow 70, represents a lag of one sample, arrow 72 represents a lag of zero, and arrow 74 represents a lag of minus one sample, for example. These lags may be in the neighborhood of 600 for each data block as previously mentioned.

Figure 7:
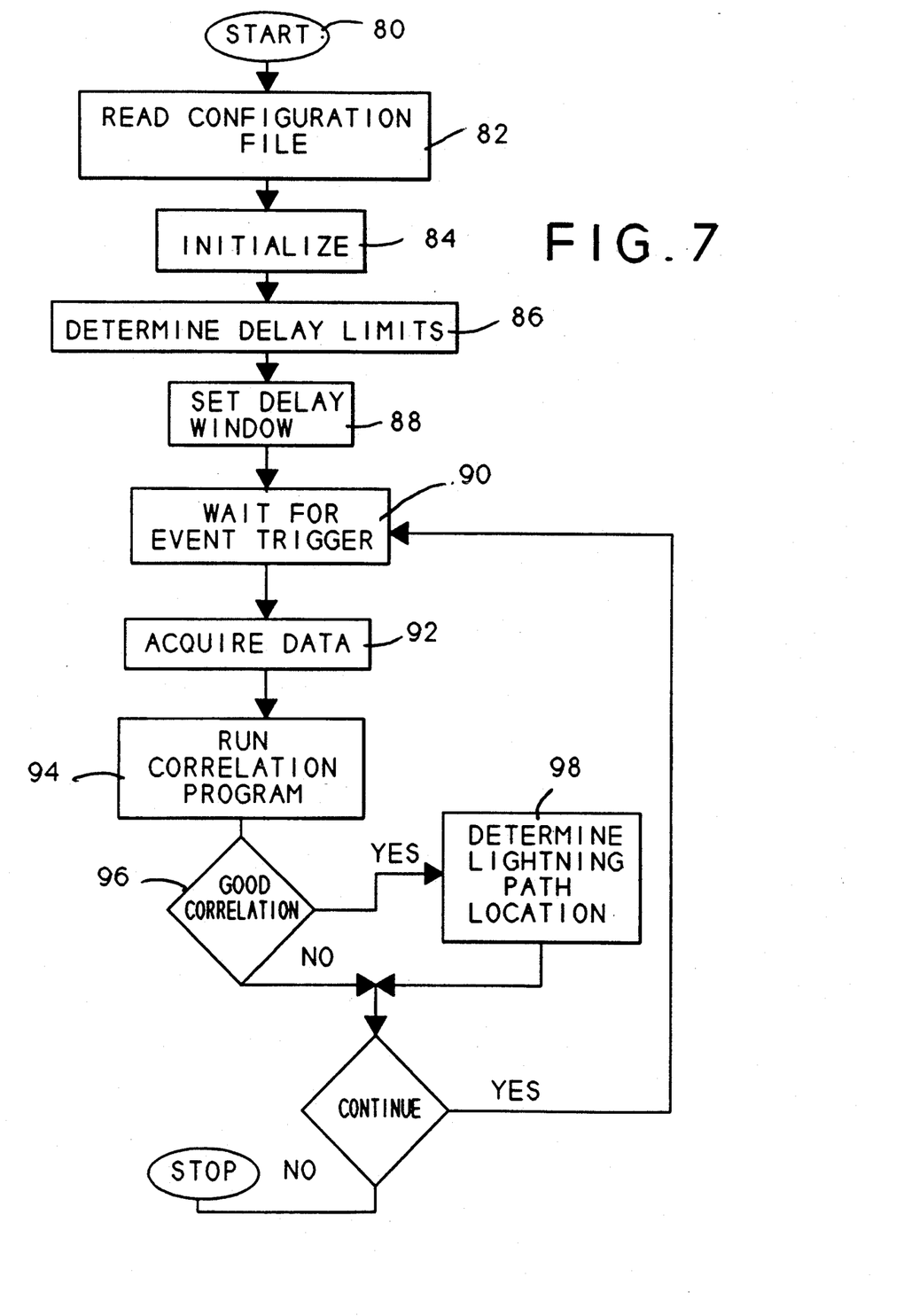
FIG. 7 is a flow chart illustrating the overall operation of the system of the present invention.

The overall function of the system is illustrated in the flow chart FIG. 7, wherein computer 60 is turned on at block 80. Steps 82 and 84 relate to certain initialization routines. At step 86, the computer sets the known limits for time delay and frequency offset. At step 88 a window within which the actual value for delays to be measured may occur is determined. However, this step is not essential to the practice of the invention.

At step 90, the routine will proceed upon the triggering of an event as described in connection with FIG. 5. When the event is triggered, the data is received, sampled and converted to the digital format and stored in dual port RAM as previously described as indicated at step 92. The correlation program is run at step 94. If the correlation is good, as indicated at decreasing block 96, then the lightning path determination is made at step 98. If the correlation is unsatisfactory, the routine returns to step 90 to await a trigger event.

Figure 8:
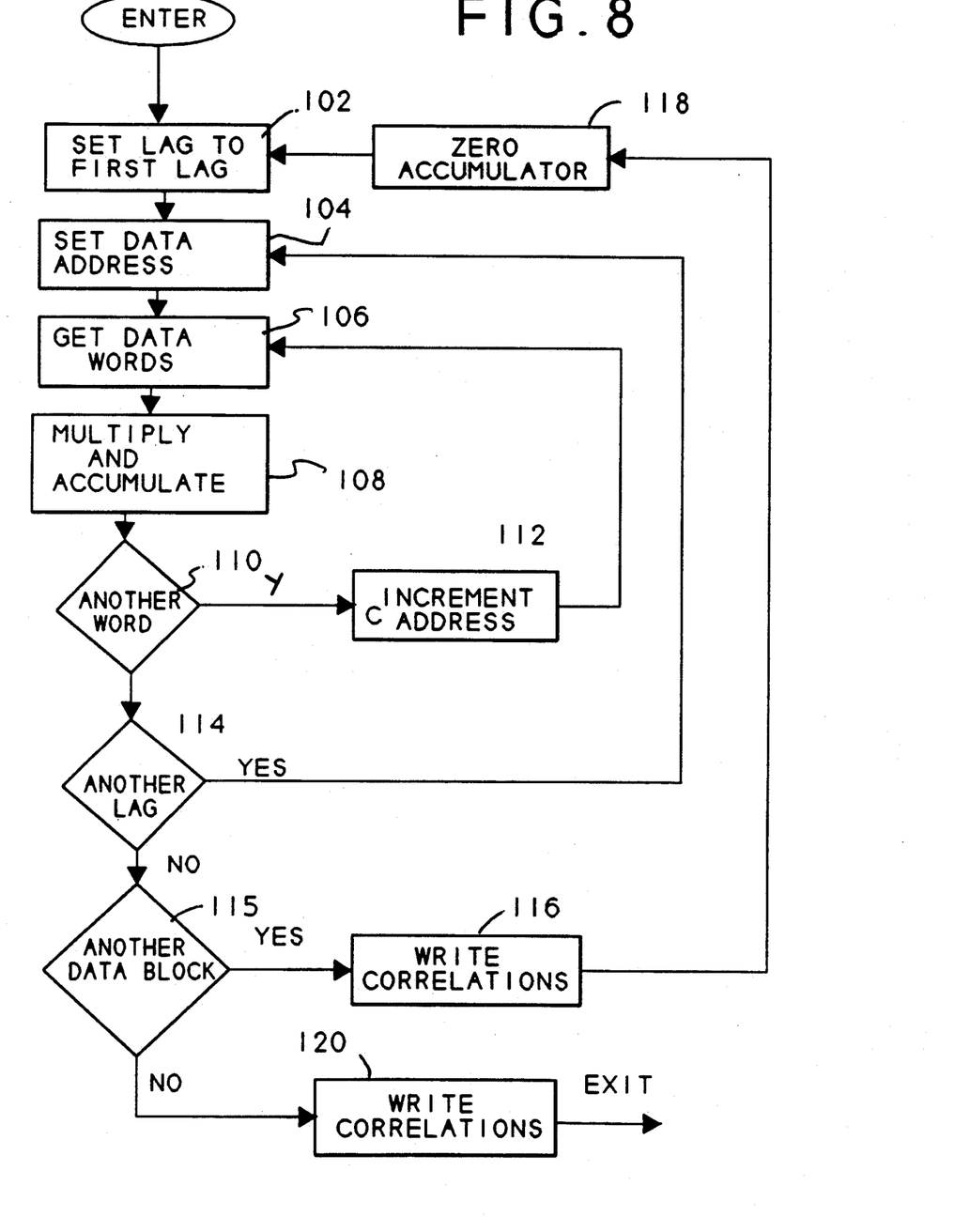
FIG. 8 is a flow chart of a correlation program in accordance with the present invention.

Referring to FIG. 8, the correlator subroutine is triggered at block 94 of the routine of FIG. 7 and the lags are set to a first lag as previously described in connection with FIG. 6 at step 102, the data addresses for the first lag are set at 104, and the data words for the first correlation is obtained at block 106. The first lag is then correlated at block 108. If there is another word for the same lag as required by decision block 110, the addresses are incremented at block 112 and other data words are obtained for the same first lag at block 106 and cross-correlated at block 108. This continues until all of the correlations have been completed for the first lag. Then the subroutine goes to decision block 114 to set the data address at block 104 to a second lag, and the previous iteration is repeated until the correlation of that next lag has been completed. This continues until all of the series of lags have been correlated. After correlation of the final lag, then as indicated at block 114, the routine loops back to block 104 if another block of data is to be correlated as indicated at block 115, after writing the correlations for the previous data block at step 116, and setting an accumulator to zero at step 118. If no more data is to be correlated, then the correlated data is written at block 120 and the subroutine exits.

Figure 9:
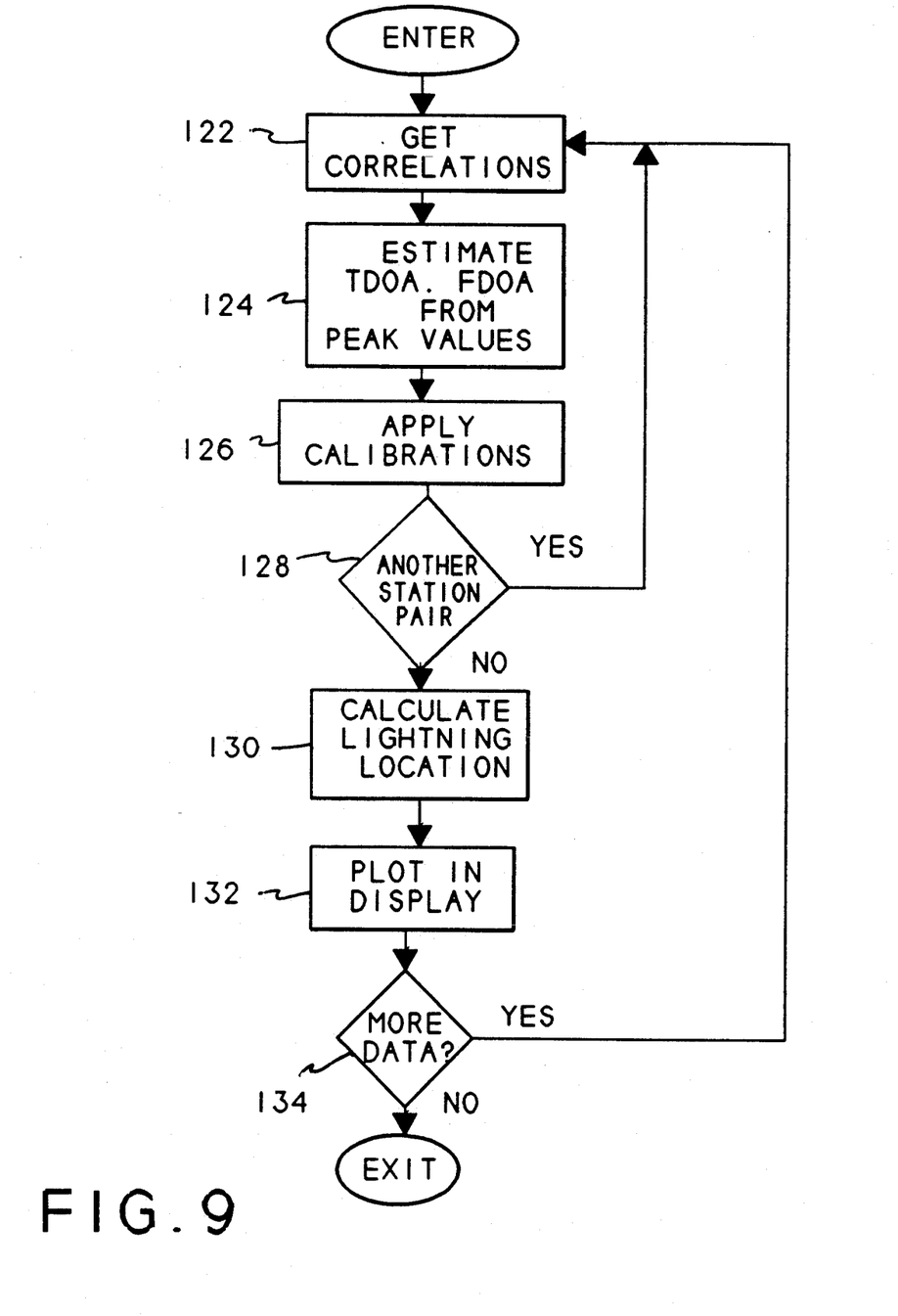
FIG. 9 is a flow chart of a routine for determining the lightning path location.

In the subroutine of FIG. 9, the system includes the step of determining the movement of a bright radiant spot of lightning during movement of the bright spot based upon a plurality of different times of arrival calculations and preferably a plurality of frequency difference of arrival (FDOA) calculations.

Referring to FIG. 9, the determination of the location of the lightning path is entered at block 98 of FIG. 7; and the correlated data is obtained at step 122. The TDOA and FDOA is estimated in accordance with the peaks of the plurality of correlations at step 124.

Then calibrations are applied at step 126. At step 128, the subroutine determines if there is another pair of receivers to estimate the TDOA and FDOA. If there are correlations from another receiver pair available, then the subroutine returns to step 122 to get additional correlations. If the estimates at block 124 have been made for all the correlations as determined by block 128, the lightning location is calculated geometrically in accordance with the peak correlations at step 130. The location is displayed at step 131 and either exits or repeats the previous process as determined at step 132.

In summary, it should be pointed out that there are many factors which influence the accuracy of lightning location. Here we will briefly discuss the effects of antenna separation (also called baseline length), lightning stroke or emitter distance and the accuracy of (TDOA) measurements.

Let the emitter be located at $\vec{r}_e$, and the receivers at $\vec{r}_1$ and $\vec{r}_2$. The time difference $t_{12}$ is $$|\vec{r}_e - \vec{r}_1| - |\vec{r}_e - \vec{r}_2| = ct_{12} \quad (1)$$

where c is the speed of the light. Given the receiver locations and the value of the time delay, this equation defines a hyperbolic surface upon which the emitter lies. If the baseline length $r_{12} = |\vec{r}_1 - \vec{r}_2|$ is small compared to the distance between the receivers and the emitter, Eq. (1) can be approximated by:

$$ct_{12} = \hat{r}_e \cdot (\vec{r}_2 - \vec{r}_1) \quad (2)$$
$$= r_{12} \cos\theta_{e12} \quad (3)$$

Here $\cos\theta_e{}_{12}$ is the angle between the baseline and emitter. Note that in this limit, TDOA measurements are essentially Angle of Arrival measurements. An error $\delta t$ in the measurement of the time delay will translate into an error in the angular measurement of magnitude $\delta$, where $$\delta\theta = c\delta t / r_{12} \quad (4)$$

This in turn will lead to an error in the position of the emitter of amount $$|\vec{\delta r}| = r_e \delta\theta = \frac{r_e}{r_{12}} c\delta t \quad (5)$$

This equation relates the uncertainty in the transverse component of the emitter location to the error in (TDOA) measurements. The uncertainty in the radial direction goes as the square of $$T = '/T_{12}$$

In the present invention the delay will be determined by searching for peaks in the cross-correlation function $\rho$, and using interpolation. The expected error $\delta t$ in the (interpolated) delay value is:

$$\delta t = \frac{\Delta t}{\rho_{SNR}} = \frac{1}{2BW\rho_{SNR}} \quad (6)$$

Here $\Delta t$ is the spacing between cross-correlation values, BW is the processed bandwidth, and PSNR is the cross-correlation SNR. If the SNR at the different receivers is positive in dB, as will generally be the case for lightning, then $$\rho_{SNR} = \sqrt{N} \quad (7)$$

where N is the number of samples used in calculating $\rho$. For N=16, $\rho_{SNR}=4$. Using a bandwidth of 1 MHz, which permits real-time processing at reasonable expense, provides an accuracy of about 100 feet for lightning within 40 miles, if a baseline of 4 miles is used. Short baselines give decreased accuracy of location in proportion to baseline length. Since airports typically permit baselines from 1 to 3 miles in length, locating antennas near the periphery of the available area gives spatial resolution which is adequate for the task of the system and method of the present invention.

The time resolution, i.e., how precisely we can determine when a signal arrives at an antenna, is distinct from the delay resolution. The time resolution is equal to the integration time used in calculating the cross-correlation function. From above, this integration time is 16/(1 MHz), or 1.7 $\mu$s. The spatial resolution of the system is determined in part by the speed of lightning propagation. The fastest propagation speed is typically about $10^7$ m/s (Warwick, 1979; Rustan, 1980; Krehbiel et al., 1991) which leads to a minimum spatial resolution of about 200 m. In order to achieve this, it is also necessary that enough samples be processed during the event to obtain a satisfactory SNR during the time it takes the emitting region to move a substantial part of a wavelength. A data block should be short enough so that the lightning does not move a substantial distance compared to the wavelength. A data block should be shorter than one microsecond.

The present invention preferably makes use of both TDOA and FDOA Frequency Difference of Arrival measurements. FDOA measurements have not been previously used in systems devoted to observing lightning. FDOA measurement is conceptually distinct from interferometer phase.

FDOA measurements will be measured simultaneously with the TDOA measurements, and are automatically available as a consequence of the measurement process. The FDOA is found by determining the harmonic time dependence of the cross-correlation function. FDOA measurement will permit better discrimination of the structure of complex events, and of events which occur simultaneously at different locations.

In the case of lightning, FDOA information tells something about the velocity of the emitting region. For the very fastest strokes, this is probably not very useful in real time. However, for other applications of the same equipment FDOA may provide useful measurement of emitter velocities.

Thus, the present invention uses unambiguous pre-detection TDOA and FDOA, rather than post-detection delay measurements or pre-detection phase measurement, to determine source direction and hence allows array elements with much greater spacing. This technique eliminates element interaction and its resultant source aliasing. Element independence in addition to the increased sensitivity of pre-detection correlation, allows more flexibility in the selection of array elements and their spacing. For example, it may be desirable to use larger, high gain antennas, such as stacked dipoles, for each array element to increase sensitivity towards the horizon at the expense of sensitivity near the element's local zenith. The intensity of radiation from lightning near an element's local zenith will be high enough to compensate for a null in the element pattern.

Cross-correlating the pre-detected signal one to unambiguously determine corresponding Time Difference of Arrival TDOA values between different pairs of baselines and the use of more than one peak correlation for each correlation pair to measure more than one lightning stroke. In ground-electricfield systems, only TDOA information is available; it must be derived from post-detection examination of sometimes-ambiguous waveforms. Because of the bandwidth, the maximum time resolution of the system is roughly 5 μs, and the spatial resolution is a few hundred meters. This analysis is performed in real time. Combined TDOA and FDOA Frequency Difference of Arrival measurements improve the accuracy of lightning bright spot locations.

In the event that more than one lightning stroke is visible at the time the system acquires data, the two or more strokes will in general be in different directions and the correlation peaks resulting from the two strokes will not be confused.

It will be apparent to those skilled in the art that various modifications and variations can be made in the method and apparatus of the present invention without departing from the scope or spirit of the invention. Thus, it is intended that the present invention cover the modifications and variations of this invention provided they come within the scope of the appended claims and their equivalents.

What we claim is:

1. A method of measuring the position of a lightning stroke, comprising
   receiving radiant energy emissions of a lightning stroke independently of one another at least three angularly spaced receivers and at a fourth central receiver spaced from the at least three receivers;
   sampling a series of radiant energy emissions from the at least three receivers and the central receiver at a predetermined rate;
   cross-correlating each of the received samples of the series of radiant energy emissions from one receiver at multiple delays with the received samples of the series from another receiver, taking all four receivers pairwise until all independent cross-correlations of the samples are obtained;
   detecting peak values from the independent cross-correlated samples; and
   calculating a location relative to the at least three receivers and the central receiver for determining the position of the lightning stroke.

2. A method of measuring the location of a lightning stroke in three dimensions, comprising
   positioning at least three angularly spaced receivers to minimize a number of nearly parallel and near parallel imaginary lines drawn between the spaced receivers, and a central receiver spaced from the three angularly spaced receivers, at least one of said spaced receivers being in a different plane, from the other receivers;
   detecting radiant energy emission of a lightning stroke independently of one another at the at least three angularly spaced receivers and the central receiver;
   sampling the radiant energy corresponding to the emission from the central location and the at least three angularly spaced receivers at a predetermined rate to generate a series of delayed samples;
   cross-correlating each of the samples from one receiver with samples from another receiver;
   taking all the receivers pairwise until all independent cross-correlations are obtained;
   detecting peak values from the cross-correlated samples; and
   calculating a location relative to the receivers range, azimuth, and elevation.

3. A system for measuring the position of a lightning stroke, comprising at least three receivers angularly spaced from one another in a coverage area, a central receiver; a cable for connecting the central receiver to each of the angularly spaced receivers; means for receiving radiant energy emissions corresponding a lightning stroke at each of the three receivers and the central receiver, means for sampling the received radiant energy from each of the receivers at a predetermined rate;
   means for determining peak values of pairs of the receivers;
   means including the peak values of each cross pair of receivers for estimating at least the time delay of arrival of the at least three angularly spaced receiver; and
   means for calculating the lightning location in accordance with the estimated time delay of arrival.

4. The method of claim 1 wherein the step of receiving radiant energy emission comprises receiving RF signals in a VHF band corresponding to the radiation of noise of lightning plasma.

5. The method of claim 1 wherein the step of cross-correlating comprises pre-detection cross-correlating for determining the relative delay and Doppler shift of the signals between pairs of receivers.

6. The method of claim 4 wherein the step of sampling the radiant energy, comprises sampling a signal corresponding to region of spatially localized hot plasma corresponding to a bright spot of radiation.

7. The method of claim 1 wherein the step of sampling comprises taking a time series of samples at a rate of twice the bandwidth of the radio emissions of the lightning.

8. The method of claim 1 wherein the step of cross-correlating comprises:
   (a) setting lags to a first lag;
   (b) setting data addresses to the first lag;
   (c) obtaining data words for a first cross-correlation;
   (d) cross-correlating the first lag by multiplying and accumulating data words;
   (e) determining the presence of another word for the same lag;

(f) incrementing address and cross-correlating other data words for same first lag;
(g) completing all cross-correlations for the first lag;
(h) repeating steps (b) through (g) for the second lag and subsequent lags until all lags are correlated.

9. The method of claim 1 wherein the step of detecting peak values comprises the sub steps of
   (a) obtaining the cross-correlations for each pair of receivers;
   (b) estimating time delay of arrival and frequency difference of arrival from correlated peak values of each correlation pair; and
   (c) repeating the substeps (a) and (b) for each of the pairs of receivers.

10. The method of claim 2 wherein the step of receiving radiant energy emissions comprises receiving RF signals in a VHF band corresponding to noise radiation of lightning plasma.

11. The method of claim 2 wherein the step of cross-correlating comprises pre-detection cross-correlating for determining the relative delay and Doppler shift of the signal between pairs of receivers.

12. The method of claim 10 wherein the step of sampling the radiant energy, comprises sampling signals corresponding to a region of spatially localized hot plasma corresponding to a bright spot of radiation.

13. The method of claim 2 wherein the step of sampling comprises taking a time series of samples at a rate of twice the bandwidth of the radio emissions of the lightning.

14. The method of claim 2 wherein the step of cross-correlating comprises:
   (a) setting lags to a first lag;
   (b) setting data addresses for the first lag;
   (c) obtaining data words for a first correlation;
   (d) cross-correlating the first lag by multiplying and accumulating data words;
   (e) determining the presence of another word for the same lag;
   (f) incrementing address and cross-correlating other data words for same first lag;
   (g) completing all cross-correlations for the first lag;
   (h) repeat steps (b) through (g) for the second lag and subsequent lags until all lags are correlated.

15. The method of claim 2 wherein the step of detecting peak values comprises the sub steps of
   (a) obtaining the cross-correlations for each pair of receivers;
   (b) estimating time delay of arrival and frequency difference of arrivals from correlated peak values of each correlation pair; and
   (c) repeating the substeps (a) and (b) for each of the pairs of receivers.

16. The system of claim 3 wherein the means for receiving radiant energy emissions comprises means for receiving RF signals in a VHF band.

17. The system of claim 3 wherein the means for independent cross-correlating comprises means for pre-detection cross-correlating for determining the relative delay and Doppler shift of the signal between pairs of receivers.

18. The system of claim 3 wherein the means for sampling the received radiant energy emissions, comprises means for sampling a VHF frequency corresponding to noise of a region of spatially localized hot plasma corresponding to a bright spot of radiation.

19. The system of claim 3 wherein the means for sampling includes means for taking a time series of samples at a rate of twice the bandwidth of the radiant energy emissions of the lightning.

20. The system of claim 3 wherein means for determining peak values comprises
   (a) means for cross-correlating each pair of receivers;
   (b) means for the time delay of arrival and frequency difference of arrivals from the cross-correlated peak values of each correlation pair.

21. The system of claim 3 wherein at least one of the three angularly spaced receivers and the central receiver are positioned in a plane different from the other receivers; and
   the means for calculating the lightning location includes means for calculating a location relative to the receivers in range, azimuth and elevation.

* * * * *